(12) United States Patent
Yakob et al.

(10) Patent No.: US 11,774,186 B1
(45) Date of Patent: Oct. 3, 2023

(54) CLEAN ENERGY SYSTEM WITH THERMAL COMPRESSION

(71) Applicant: M.E.D. Energy Inc., Binghamton, NY (US)

(72) Inventors: Kameran Yakob, Carouge (CH); Francois Ignace Geinoz, Bulle (CH); Cueni Marcel, Bulle (CH)

( * ) Notice: Subject to any disclaimer, the term of this patent is extended or adjusted under 35 U.S.C. 154(b) by 0 days.

(21) Appl. No.: 18/097,256

(22) Filed: Jan. 15, 2023

Related U.S. Application Data

(60) Provisional application No. 63/343,911, filed on May 19, 2022.

(51) Int. Cl.
| | |
|---|---|
| H05B 6/10 | (2006.01) |
| H05B 6/80 | (2006.01) |
| F28D 20/02 | (2006.01) |
| F25B 9/00 | (2006.01) |
| F25B 9/14 | (2006.01) |
| F28D 20/00 | (2006.01) |

(52) U.S. Cl.
CPC ............ *F28D 20/026* (2013.01); *F25B 9/008* (2013.01); *F25B 9/14* (2013.01); *H05B 6/108* (2013.01); *F28D 2020/006* (2013.01); *F28D 2020/0078* (2013.01)

(58) Field of Classification Search
CPC ............ F28D 20/026; F28D 2020/006; F28D 2020/0078; F25B 9/008; F25B 9/14; H05B 6/108
USPC ........................................ 219/634, 635, 628
See application file for complete search history.

(56) References Cited

U.S. PATENT DOCUMENTS

| | | | | |
|---|---|---|---|---|
| 3,032,410 | A * | 5/1962 | O'Day | .................... C21B 13/14 |
| | | | | 75/10.36 |
| 10,513,052 | B2 * | 12/2019 | Suzuki | .................... B29C 39/24 |
| 2016/0045841 | A1 * | 2/2016 | Kaplan | .................... C01B 32/05 |
| | | | | 429/49 |

* cited by examiner

*Primary Examiner* — Quang T Van
(74) *Attorney, Agent, or Firm* — Cittone Demers & Arneri LLP; James Demers

(57) ABSTRACT

The invention provides a device for the inductive compression of carbon dioxide via isochoric heating. The resulting hot, supercritical or compressed carbon dioxide is suitable for driving a gas turbine with highly efficient use of the input thermal energy, for local heating and cooling applications, and for pipeline transportation to remote locations where the high enthalpy content of the gas can be harvested.

11 Claims, 7 Drawing Sheets

CLEAN ENERGY SYSTEM WITH THERMAL COMPRESSION

RELATED APPLICATIONS

This application claims the benefit of the priority of U.S. Provisional Application No. 63/343,911 filed on May 19, 2022.

FIELD OF THE INVENTION

The present invention generally relates to the storage, retrieval and transmission of thermal energy, and in particular to the cyclic compression and decompression of carbon dioxide as a means of managing thermal energy.

BACKGROUND

Electrical generation by fossil fuel combustion or nuclear energy sources is invariably accompanied by the generation of a considerable amount of waste thermal energy. Exhaust gases and cooling water having temperatures too low for efficient recovery of the contained energy are ordinarily vented to the atmosphere, or cooled by evaporation in cooling towers.

Numerous schemes have been developed for the recovery of usable energy from waste heat. H. Jouhara et al., "Waste heat recovery technologies and applications," *Thermal Science and Engineering Progress*, 6:268-289 (2018), doi.org/10.1016/j.tsep.2018.04.017. The most efficient of these employ working fluids operated through Rankine or Joule-Brayton cycles. Similar considerations apply to power generation via heat extraction from geothermal, fossil fuel, and nuclear sources, with variations and modifications appropriate to the higher temperatures employed.

The use of carbon dioxide as a working fluid in heat recovery and power cycles is an active area of research. S. Glos et al., "Assessment of performance and costs of CO2 based next level geothermal power (NLGP) systems," *3rd European Conference on Supercritical CO2 (sCO2) Power Systems* 2019, pp. 49-58, doi.org/10.17185/duepublico/48876; P. Liu, et al., "Carbon Dioxide as Working Fluids in Transcritical Rankine Cycle for Diesel Engine Multiple Waste Heat Recovery in Comparison to Hydrocarbons," *J. Therm. Sci.* 28:494-504 (2019), doi.org/10.1007/s11630-019-1090-z; M. Poerner, A. Rimpel, "Waste heat recovery," in: *Fundamentals and Applications of Supercritical Carbon Dioxide (sCO2) Based Power Cycles*, K. Brun, P. Friedman, R. Dennis, Eds., Woodhead Publishing, 2017, pp. 255-267, doi.org/10.1016/B978-0-08-100804-1.00010-4.

In high-temperature applications, such as nuclear and solar concentration power plants, carbon dioxide has been much studied as a working fluid in power cycles. In Joule-Brayton cycles, the carbon dioxide is not condensed, and remains in the vapor region of the phase diagram, but advantage is taken of the relatively low specific work needed to compress the gas when it is close to the critical point. In the related "supercritical cycle", the carbon dioxide remains in the supercritical region through the heat-addition and heat-rejection portions of the cycle. A third approach, more suitable for low-temperature applications such as waste heat recovery and geothermal energy, is the transcritical Rankine cycle, in which the carbon dioxide cycles between supercritical, vapor, and condensed liquid phases.

The so-called Allam cycle (U.S. Pat. No. 8,596,075), in which superheated CO2 is injected into the pre-combustion feed for a gas turbine, relies upon separation, compression, and re-circulation of part of the CO2 in the turbine exhaust, with the remainder of the CO2 being at a pipeline pressure suitable for transportation or for sequestration by deep well injection.

Carbon dioxide is a superior medium to hot water and steam for transportation of thermal energy via pipelines, due to its high specific heat and considerably lower viscosity, which reduces the pressure drop over distance. The use of CO2 as an energy transport medium requires compression of the CO2 at the source, and re-compression at intervals if long distances are involved.

A waste-to-energy conversion process has recently been described (U.S. patent application Ser. No. 16/600,539) which yields large quantities of a mixture of syngas and carbon dioxide. Separation of the carbon dioxide relies upon compression to about 50 atm, and cooling to about 5° C., in order to selectively condense and separate liquid carbon dioxide.

The use of carbon dioxide as a working fluid in all of the above power cycles, energy recovery systems, and energy transport systems requires an energy-efficient means of compression of the gas. This is presently accomplished with mechanical compressors of various designs.

Mechanical compressors fall into two categories: positive displacement (e.g., piston and rotary vane pumps, and dynamic displacement (e.g., axial and centrifugal compressors.). Both categories transfer energy to gas molecules via physical collision of gas molecules with moving mechanical components of the pump. The efficiency of these compressors is limited to 30-50% by electrical, thermal and mechanical losses. In power plants, this can be made up for to some extent by constructing the compressor on a common shaft with the turbine and generator, but there remains a need for a more efficient compression method. Another common shortcoming among most mechanical compressors is their inability to operate at very high temperatures, due to the presence of lubricated seals and bearings.

BRIEF DESCRIPTION OF THE INVENTION

Briefly, the apparatus of the invention compresses carbon dioxide in steps, with the capability of further raising the enthalpy of the gas via an internal heating means. The energy stored in the compressed gas, which at sufficiently high pressures may be in a supercritical phase, may be subsequently extracted by expansion through a turbine, generating electricity, by injection into the pre-combustion stream in an Allam cycle power plant. The invention also provides a method for transmission of the hot, compressed CO2 through a piping system to remote destinations for local energy extraction. Supercritical CO2 is well-suited for long-distance transmission via pipeline, in that it combines the density of a liquid with the low viscosity, and low pressure drops over distance, of a gas. After mechanical energy is extracted by expansion of the supercritical CO2, the still-pressurized gas is suitable for further industrial use, for cooling by expansion, or for deep-well injection as a means of environmental remediation.

The invention also provides an energy distribution system, by which hot, compressed and optionally supercritical CO2 is transported by pipeline to destinations where the energy stored in the gas can be extracted as needed.

The invention provides an apparatus capable of mechanical and non-mechanical compression of a gas. This aspect of the invention overcomes some of the inefficiencies and disadvantages of mechanical compression by using heat to raise the pressure of the gas at a fixed volume (isochoric heating), thereby adding to the enthalpy of the gas. The heating of the gas is preferably accomplished by electrical induction within the apparatus. In certain embodiments, there may be recuperation of excess heat from the gas.

The compression apparatus of the present invention, referred to herein as an "inductive thermal compressor," uses compression of gases by an increase in their temperature, in a constant volume, with minimal heat transfer between the system and the external environment. The electrical energy expended during thermal compression thus remains stored within the fluid in the form of increased enthalpy; suitable insulation ensures that minimal energy is dissipated as waste heat. Heat is preferably removed and recovered after each thermal compression stage, while minimizing loss of pressure, so as to operate in or close to the supercritical regime. This can be accomplished, in part, by decreasing the diameter of the pipes and tubing in proportion to the operating temperature at the relevant location.

The energy transferred to the gas by the inductive heaters is thus accumulated in mechanical form (via compression) and in thermal form (via temperature increase). Subsequently, the accumulated enthalpy (mechanical and thermal energy) of the gas can be reconverted into electrical energy via a gas turbine with excellent efficiency, and/or into cooling power via expansion of the gas. The inductively-heated, thermal compression stages operate with minimal mechanical losses, and with excellent thermal efficiency.

DETAILED DESCRIPTION OF THE INVENTION

I. Thermal Compression

Figure 1:
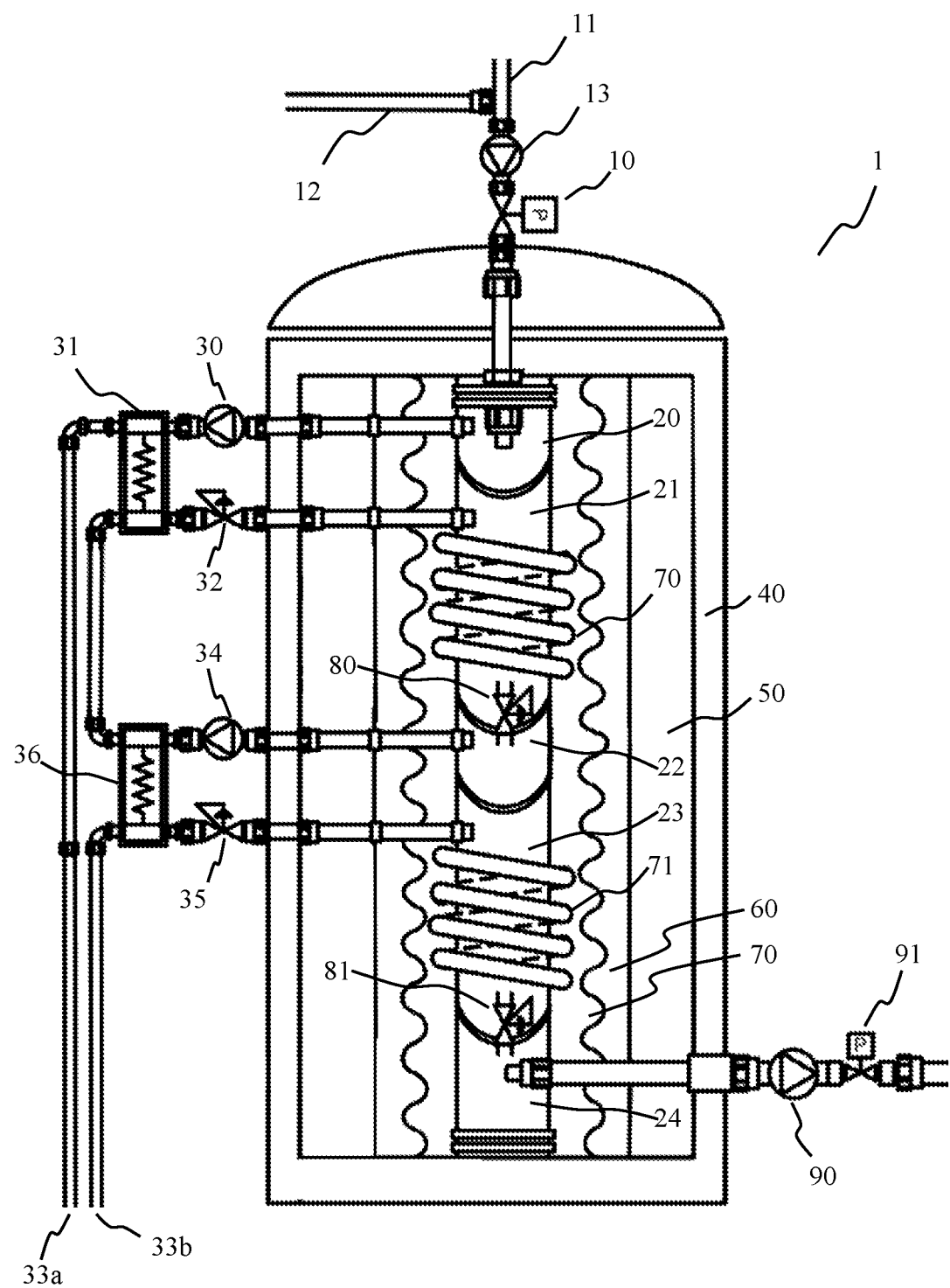
FIG. 1 shows an inductive thermal compressor according to the invention.

The inductive thermal compressor of the invention (also referred to as a "thermal compressor") is preferably integrated into an energy production chain in order to produce CO2 in a state that can serve as a carrier of thermal energy (via elevated temperature) and mechanical energy (via gas pressure.). In this form, the energy represented by the increased enthalpy of the gas can stored, transported, and transformed into another form, such as electricity, where needed. Such an energy distribution system is described, for example, in U.S. patent application Ser. No. 16/663,954.

The thermal compressor of the invention responds quickly to energy consumers' demand by providing heating, cooling, or electricity at any time, at different temperatures and in variable proportions.

The thermal compressor system, in one embodiment, differs from prior art mechanical gas compressors in that conventional volumetric circulation and compression pumps for the gases, each of which can develop a gas pressure of up to 5 or 10 bar, constitute a first compression means, while electrical induction coils, which provide direct, efficient heating under isochoric conditions to further raise the pressure, constitute a second compression means. The induction coils heat the ferroelectric walls of the compression chambers directly, without themselves rising to high temperatures, which results in very rapid, efficient and low-loss heating of the chambers. In a second embodiment, the inductive thermal compressor is used as a single, primary compression means, with mechanical pumps used only if needed or desired to aid in the circulation of the heated CO2.

The resulting product is compressed CO2 in gaseous or condensed form, at temperatures typically ranging from ambient to about 200° C., although temperatures up to 800° C. are possible where heating is the primary application. In preferred embodiments the produced CO2 is in a supercritical state. The use of CO2 as a cooling agent or as a heat carrier is particularly efficient when advantage can be taken of a change of state to liquid or supercritical form, and of the relatively low amount of work required for compression near the critical point.

The thermal compressor's inputs may be partly made up of returns from a CO2-based energy distribution system, as described in U.S. patent application Ser. No. 16/663,954, and partly of CO2 emissions from an external source, such as a combustion-fueled electrical generation facility, a waste-to-energy plant, a cement kiln, or the like. The temperatures and pressures of the inputs are constantly monitored, and their relative proportions are preferably manipulated so that the state of the blended feed is close to the critical point of CO2. In some embodiments, the overall system may operate essentially as a closed loop, in which the exhausted (low enthalpy) energy transport fluid, CO2, is returned to the compressor to be re-pressurized and re-used. Where high-enthalpy CO2 (e.g. combustion gases from an energy production facility) is available as an input, it will be more economical to dispose of at least a portion of the used, low enthalpy gas by venting, by agricultural use in high-CO2 greenhouses and/or in carbonated irrigation water, or as a feedstock for a CO2-dependent process.

It should be understood that for the purposes of the present invention, "carbon dioxide" refers to a gas that is not necessarily chemically pure. Gas of any purity may be employed, provided that the operation of the system is not prevented, and CO2 of 80% purity or better is expected to be useful. Pressures recited herein are approximate, and "bar" and "atm" are equivalent units for all purposes.

Turning to FIG. 1, the structure and operation of a representative thermal compressor 1 will be described. The central part of the thermal compressor comprises several compartments, operating at increasing pressures, which are separated by bulkheads and fitted with pressure regulating valves. Two chambers are fitted with induction heating coils (70 and 71 in the embodiment shown), which when activated serve to add thermal energy to the gas, raising the pressure when the valves to the chambers are closed. The compressor may be surrounded by an insulating jacket 40, which encloses an outer chamber 50 which in turn substantially encloses an intermediate chamber 60. Enclosed within intermediate chamber 60 are a series of core pressure chambers, for example 20-24 as shown in this embodiment. Intermediate chamber 60 is pressurized with a gas maintained at 30 to 50 bar, which helps support the inner pressure chambers against their internal pressures. In turn, the outer chamber 50 is filled with a gas maintained at 30 to 50 bar, which helps support intermediate chamber 60 against its own internal pressure. The use of concentric containers of increasingly high pressure gas makes it possible to construct the high-pressure chambers 20-24 without the use of extremely heavy and thick walls; effectively the apparatus uses compressed gas as a structural component. This reduces the net internal pressure on the inner pressure chambers by 60 to 100 bar, with a corresponding decrease in the required thickness and strength of the inner chamber walls. The concentric pressure chambers make it possible to contain core pressures as high as 150 bar with ordinary construction. The gas within chambers 50 and 60 is conveniently CO2, but gases of high insulating value such as argon can be employed. Pressures in chambers 50 and 60 may be maintained by small, high-pressure pumps (not shown), or through the use of process CO2 as described below. Optionally, the gases in chambers 50 and 60 may be circulated to heat exchangers and/or bled into the compressor's process stream as needed to regulate the core temperatures.

Surrounding the high-pressure chambers 20-24 is an optional layer 70 of insulating material. This may be any suitable material; typically it will be fiberglass or a refractory insulation such as alumina or ceramic.

Low-pressure (ca. 10-50 bar) CO2 gas is metered into the first chamber 20 via pressure regulating valve 10. In the embodiment shown, the feed gas may be a mixture of high-enthalpy (high-temperature and/or high pressure) gas from a source of such gas, and/or cooler gas being returned from an energy distribution system, turbine, or other source of enthalpy-depleted gas, and optionally a portion of the pressurized gas produced by the compressor, which can be recirculated to help maintain the inlet gas conditions. These gases are brought to equal pressure, delivered by feeds 11 and 12 to compressor 13, and pumped though pressure-regulating valve 10 into chamber 20. Pressure-regulating valve 10 establishes the operating pressure in chamber 20. Compressor 13, and other compressors used in the invention, may be of any suitable construction, and of a size appropriate for the scale of operation. The selected compressors should be capable of raising the pressure of the working gas by up to 5 bar, and preferably by up to 10 bar.

For large-scale applications, multi-stage axial turbomachines are preferred, while for smaller-scale applications radial-inflow turbine and centrifugal compressor designs, which can accommodate the required pressure change over a single stage, are preferred. The selection and sizing of appropriate CO2 compressors is within the ability of those skilled in the art; see for example T. C. Allison et al., Fundamentals and Applications of Supercritical Carbon Dioxide (SCO2) Based Power Cycles, K. Brun, P. Friedman, R. Dennis (Eds.), Woodhead Publishing, 2017, pp. 147-215, doi.org/10.1016/B978-0-08-100804-1.00007-4; and A. Ameli et al., "Centrifugal compressor design for near-critical point applications," J. Eng. Gas Turbines Power 141:3 (2019) 031016, doi.org/10.1115/1.4040691. Specialized CO2 compressors may also be sourced commercially from among the products used in oil field EOR (enhanced oil recovery) and in CO2-based refrigeration and HVAC systems.

Pressurizing/circulation pump 30 raises the pressure, preferably by about 5 bar to about 10 bar, and the gas is either passed through an optional heat exchanger 31, if cooling is desired, or else diverted through a bypass (not shown) to the valve 32. Cooling via exchangers 31 and 36, while pressure is maintained by pumps 30 and 34, serves to increase the density of the gas. Such cooling permits the system to operate with greater mechanical efficiency, because less energy is required to boost the pressure of a cooler and denser gas stream. The coolant, circulated via pipes 33a and 33b, can be any convenient fluid, e.g. water from the environment or a chilled fluid component of the facility HVAC system.

Valve 32 meters the gas into the first induction-heated chamber 21, which is constructed of iron, ferrous alloy, or other ferromagnetic material. The chamber 21 is situated within the coils of a first induction heater 70. With valves 32 and 80 closed, induction coil 70 is energized, so as to heat chamber 21 and the gas therein, raising the pressure to about 20 bar. When the target pressure is reached, valve 80 is opened, permitting the heated and pressurized gas to flow into chamber 22. At this point, valve 80 is closed, and the contents of chamber 22 are available for use as pressurized, heated CO2.

In the embodiment shown, the above process is repeated in an optional second stage. In the two-stage embodiment, pressurizing/circulation pump 34 raises the pressure, preferably by about 5 bar to about 10 bar, and the gas is either passed through an optional heat exchanger 36, if cooling is desired, or else diverted through a bypass (not shown), to the valve 35. Valve 35 meters the gas into the second induction-heated chamber 23, which is likewise constructed of ferromagnetic material and is situated within the coils of a second induction heater 71. With valves 35 and 81 closed, induction coil 71 is energized, so as to heat chamber 23 and the gas therein, raising the pressure in proportion to the rise in temperature. When the target pressure is reached, valve 81 is opened, permitting the heated and pressurized gas to flow into chamber 22. At this point, valve 81 is closed. Pump 90 and regulating valve 91 are then used to draw off the CO2 at the desired outlet pressure.

If each pressurizing/circulation pump is capable of raising the pressure of the input gas by about 5-10 bar, operation of pumps 30 and 34 in series will raise the pressure by about 10-20 bar above the inlet pressure set by valve 10. Operation of the inductive heater 70 can raise the temperature and pressure of the gas in chamber 21 to any level that is consistent with the pressure rating of the heat exchanger 36 and with the desired net throughput of CO2.

Figure 2:
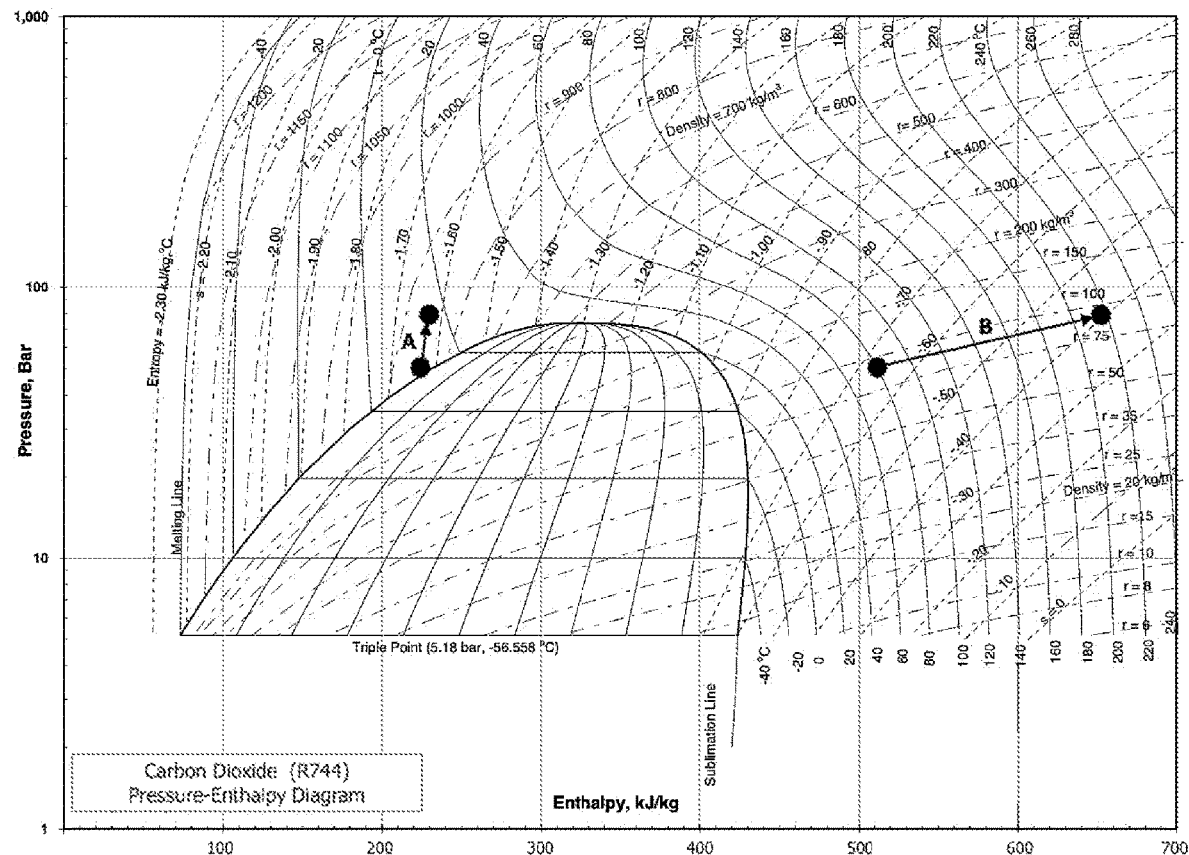
FIG. 2 is a pressure-enthalpy diagram for carbon dioxide.

The advantage of operating the thermal compressor close to the critical point is apparent from the following comparison. The gas confined in the heating chambers 21 and 23 has a fixed mass, a fixed volume, and a fixed density, and thus the inductive heating is an isochoric (constant volume) process. If an ideal gas was confined to such a chamber at 10° C. (283 K), raising the pressure from an initial value of 50 bar to a final pressure of 75 bar would require raising the temperature to 152° C. (425 K). However, with reference to the pressure-enthalpy diagram of CO2 (see FIG. 2), it can be seen that given CO2 at 50 bar and 10° C., and following Path A along a line of constant density, the pressure can be raised to 75 bar with less than a 10° C. rise in temperature, and only a 6 kJ/kg change in enthalpy (ΔH). By contrast, if the CO2 enters the chamber at 50 bar and 80° C., it must follow Path B to reach 75 bar, which require raising the temperature to about 218° C. (491 K), with an energy input of 140 kJ/kg. Given a flow rate through the compressor of 1 kg/sec, achieving 75 bar thermally via Path A requires a power input to the inductor coil of ca. 6 kW, whereas achieving 75 bar via Path B would require 140 kW. These inputs are over and above the energy required to drive the mechanical compressors, which will vary with the gas densities and pressures they are called upon to deliver, but in thermal compression there are no losses due to friction or other mechanical inefficiencies.

For the above reasons, it is preferable to operate the thermal compressor under conditions close to the critical point of $CO_2$, where the gas properties depart significantly from ideal behaviour. As noted above, manipulation of the feed gas composition by blending gases of various pressures and temperatures can be used to bring the starting gas closer to the critical point.

Gas pressurised by heating in the induction chamber 21 is fed into chamber 22 though valve 80 when it reaches a target pressure, which, to allow for expansion, will be somewhat above the pressure desired in chamber 22.

The above-described process may then be repeated: gas from chamber 22 can be moved via pump 34 through valve 35 to chamber 23, preferably after being cooled in heat exchanger 36. As gas cools in the exchanger 36, the pressure drop is countered by the inflow of additional $CO_2$ from pump 34. With valves 35 and 81 closed, the gas in chamber 23 is then heated by inductor coil 71 to raise its pressure further, at which point valve 81 is opened so as to pass the gas to the final chamber 24. The hot, pressurized $CO_2$ is then drawn off via pump 90 through regulating valve 91. The $CO_2$ at this stage may be suitable for use in an Allam cycle or for delivery to a turbine, and in a preferred embodiment it may be above the critical pressure, making it suitable for pipeline transportation in an energy distribution system as described below. A portion of this final stage gas can optionally be recirculated to chamber 20, if required to bring the input gas close to the critical point.

The skilled artisan will appreciate that the pressure and temperature ranges to be expected at each stage of the process are dependent on the selected working parameters. For example, the conditions of entry of the working fluid into the inlet chamber 20 are set by the inlet pressure control 10 and, in case of partial recirculation of the working fluid at the outlet of the system, by the outlet pressure control 91. The pressure increase ΔP due to the action of the circulating pump 30 is generally 5 to 10 bar. The minimum outlet pressure to the chamber 21 is set by the one-way pressure regulating valve 32. The outlet temperature of the working fluid as it enters chamber 21 is set by the adjustable parameters of the heat exchanger 31. The pressure limit reached by the working fluid before being evacuated from chamber 21 is set by the non-return valve with downstream pressure control 80. Similar considerations apply to operation of the second stage of thermal compression. Third and fourth stages may optionally be provided if higher output pressures are desired.

In one preferred embodiment, a two-stage thermal compressor is operated with operating parameters that provide outlet $CO_2$ at 80-150 bar and 120° C. to 150° C.

The induction coils 70 and 71 have variable power outputs, determined by the electric current directed through them, and this power can be rapidly switched on and off. This makes it possible to increase the temperature of the working fluid in chambers 21 and 24 by tens to hundreds of degrees, on a time scale of tens of seconds. There is limited energy exchange with the external environment on this time scale, therefore the heating of the gas in the chamber is very nearly adiabatic. The combination of near-adiabatic isochoric heating with the near-100% efficiency of inductive heating provides a compression means of extremely high efficiency, relative to the prior art mechanical compression means.

(II) Energy Management

Figure 3:
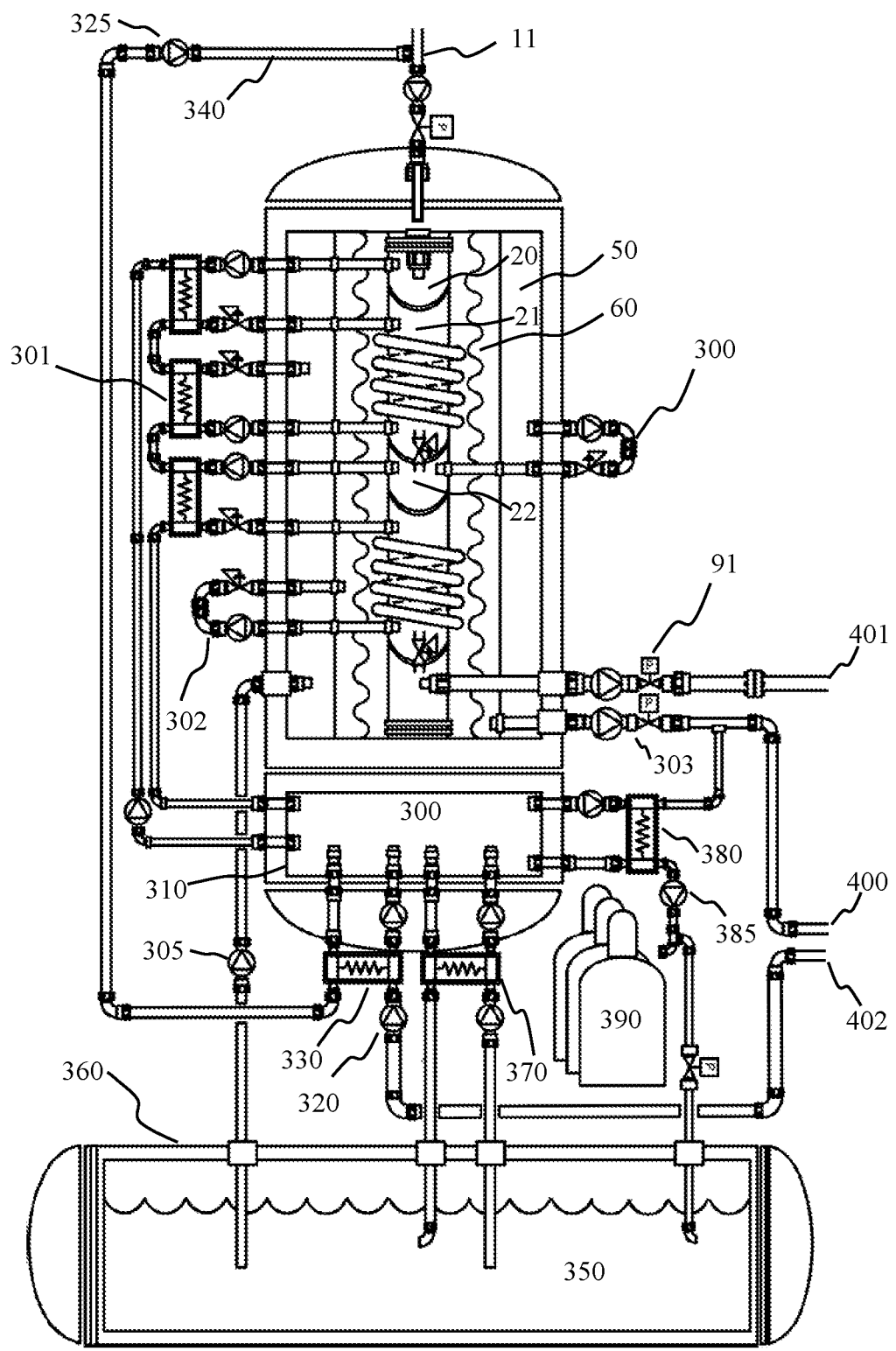
FIG. 3 is a diagram showing the compressor of FIG. 1 associated with thermal energy storage and cooling systems.

Turning now to FIG. 3, the management and storage of the high-enthalpy $CO_2$ supplied by a thermal compressor of the invention is described. The thermal compressor in the embodiment illustrated in FIG. 3 is provided with optional means for $CO_2$ flow through the outer and intermediate pressure chambers. Outer chamber 50 is provided with a $CO_2$ inlet system comprising heat exchanger 301 and its attached compressor and valve, which admits compressed $CO_2$ from the heated chamber 21. Cold $CO_2$ from reservoir 350 can also be metered in via pump 305. Gas exits chamber 50 via outlet system 300, which comprises a compressor and valve that conduct $CO_2$ to core chamber 22. Intermediate chamber 60 is provided with $CO_2$ inlet system 302, comprising a compressor and valve, and outlet system 303 also comprising a compressor and pressure regulating valve. Inlet system 302 supplies a flow of gas from heated chamber 23, and the outlet system 303 delivers intermediate-pressure gas, for liquefication and storage in vessel 360 and for use outside of the compressor. This gas may also be used, for example, as an input to chamber 20, if needed to bring the inlet gases close to the critical point.

The thermal compressor in this embodiment is provided with an optional reservoir 310 of coolant 300 that receives heat absorbed by the heat exchangers (31, 36 and 301), and from other heat exchangers as described below. The coolant 300 may be any suitable fluid known in the art, including but not limited to water, glycols, and silicone and hydrocarbon oils. Heat collected by the coolant is removed via heat exchanger 370, using the cold, liquid $CO_2$ reservoir 350.

The various heat exchange devices illustrated are optional, and can be individually activated, deactivated, or operated at a desired rate of heat transfer, depending on the type and quantity of energy being demanded of the system. The overall principle is that $CO_2$ is compressed by heating in chambers 21 and 23, and then cooled in exchangers 31 and 36 while pumps 30 and 34 maintain the pressure gained in the chambers. The apparatus can be operated in a wide range of pressure and temperature regimes, so long as the operating principle is adhered to, but it is most efficiently operated when the $CO_2$ is in the general vicinity of the critical point. Operation in the ranges 30-100 bar and 20-80° C. is contemplated to be most efficient.

As described above, carbon dioxide from an external supply is fed into the compressor at inlet 11. Carbon dioxide being returned from an energy transport system arrives via pipe 402 and is raised via pumps 320 and, if necessary, 325 to a pressure appropriate for injection into the thermal compressor. Heat of compression can be removed via heat exchanger 330 before being delivered to the thermal compressor via inlet 340.

In a preferred embodiment, an optional reservoir of liquid carbon dioxide 350 is maintained in a vessel 360 at a pressure that maintains the $CO_2$ in a liquid state. Preferably, the liquid $CO_2$ is maintained at about 0-10° C. and about 30-50 bar. The liquid $CO_2$ may be maintained at the required temperature via external cooling, or by controlled boil-off of the $CO_2$.

Medium-pressure $CO_2$ is drawn from the intermediate chamber 60 at valve 303, and delivered to the reservoir 360 after being cooled via heat exchanger 380 and compressed at 385 to the liquid state. If desired, at this stage the liquid $CO_2$ can also be transferred to cylinders 390 for entry into commerce. The medium-pressure $CO_2$ gas may also be delivered to the distribution system via pipe 400, along with high-pressure $CO_2$ delivered via pipe 401.

III. Energy Distribution

Figure 4:
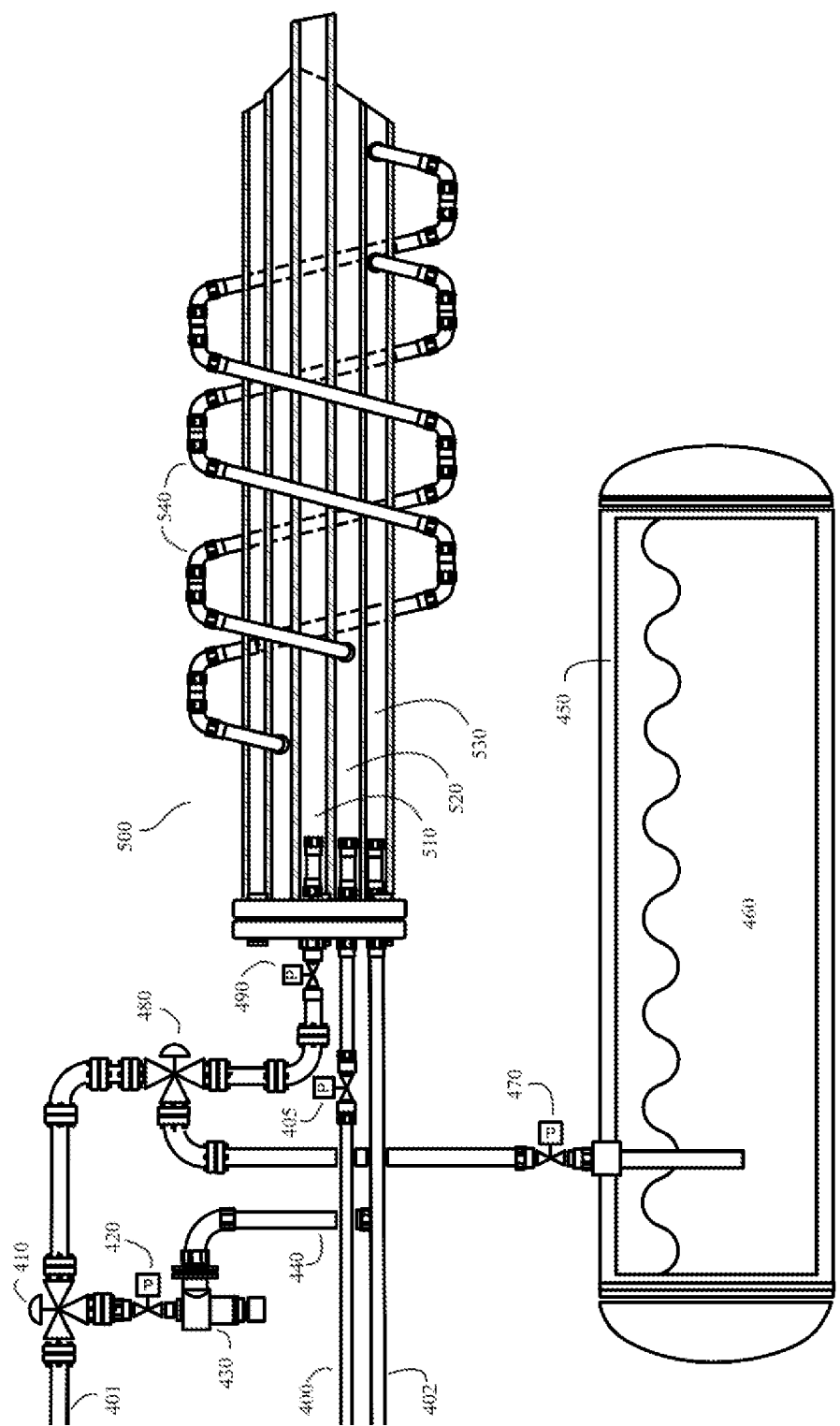
FIG. 4 is a diagram showing the compressor of FIG. 1 and the storage and cooling systems of FIG. 3 associated with a CO2 pipeline system.

Turning to FIG. 4, the distribution of pressurized $CO_2$ from the system shown in FIG. 3 will be described. The flow of high-pressure, supercritical $CO_2$, delivered via pipe 401, is optionally tapped at valve 410 and regulator 420, and expanded through a turbine and generator 430 to provide a local source of electrical power to the system. The cooled, expanded CO2 exiting the turbine at 440 is recirculated to the thermal compressor via pipe 402. The bulk of the supercritical CO2 passes to tap 480, through which a reservoir of supercritical CO2 460 is maintained at about 150 bar and up to 300° C. in insulated pressure vessel 450, which helps to buffer this part of the system against excursions from the supercritical regime. The pressurized CO2 gas and supercritical CO2 supplied by the thermal compressor are fed via pressure regulators 405 and 490, respectively, into the distribution pipeline 500.

The distribution of a high flow of supercritical carbon dioxide at pressures on the order of 80-150 bar would not be practical with ordinary piping over long distances, due to the limited diameter and heavy walls of the required piping. (For example, 10-inch steel pipe capable of safely containing 150 bar of pressure, would be Schedule 80 XS pipe weighing 64.4 lbs per linear foot.) The distribution system of the invention overcomes this limitation by employing concentric piping, wherein a pipe 510 carrying high-pressure supercritical CO2 is enclosed in an annular jacket 520 containing gaseous CO2 at a pressure that is, for example, 30 bar lower than that in the pipe 510. The inner pipe 510, accordingly, needs to be constructed only to withstand a net pressure of about 120 bar. In a preferred embodiment, illustrated here, a third, outer annular pipe 530 surrounds the high-pressure gas pipe 520, and carries depleted-energy CO2 gas back to the thermal compressor. The pressure within pipe 530 permits pipes 520 and 510 to be operated at a correspondingly higher absolute pressures. The use of concentric piping for transportation of high pressure fluids is a known technique; see for example J. E. Zafarovich et al., patent publication RU2140605-C1, and S. Fujimoto et al., patent publication JP2004251350-A.

Figure 5:
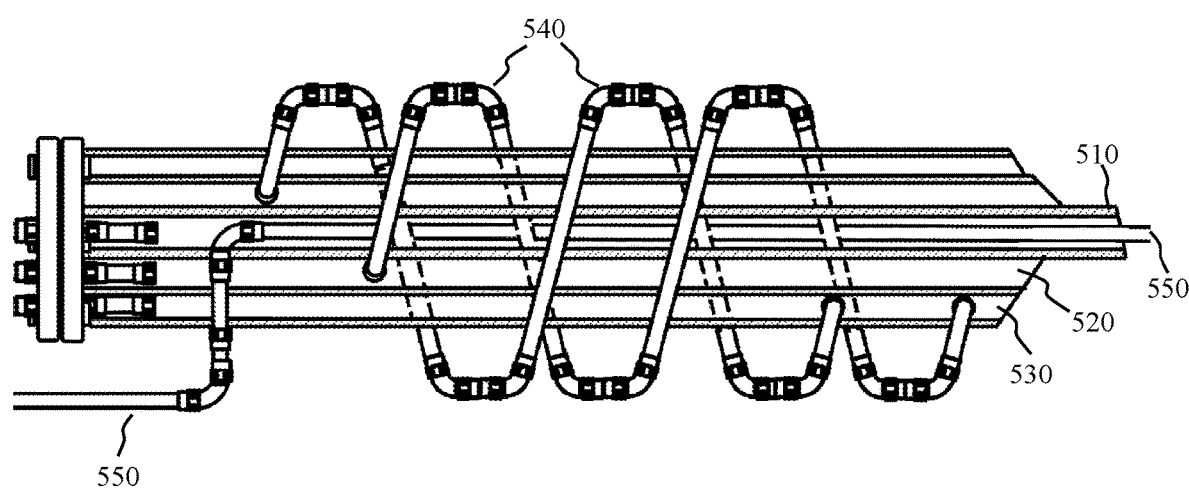
FIG. 5 shows an embodiment of a CO2 pipeline that encompasses a steam pipe.

The concentric piping of the invention also serves to conserve energy, in that heat lost from the inner pipes 510 and 520 is transferred to the CO2 flowing the other way in the outermost pipe 530, and is thus returned to the energy source. In an alternative embodiment, illustrated in FIG. 5, a steam pipe 550 transmitting high-energy steam is carried within the bore of the supercritical CO2 line 510. Steam line 550 may carry steam at high temperature (300° C. to 400° C.) and high pressure (40 to 80 bar.) The steam line serves to maintain or raise the temperature of the supercritical CO2, and to deliver steam along with supercritical CO2 to the end user. Conversely, the concentric CO2 pipes offer insulation to the steam pipe 550, and a large measure of energy recovery in that heat transferred to the CO2 is still delivered to the end user. The use of steam as an energy transport fluid is well-known in the art, and all of the usual methods of use are contemplated.

In certain embodiments, optional heat exchange pipes 540 are present, and are duplicated along the pipeline at suitable locations. The spiral structure shown in FIG. 4 is only one of many possible structural embodiments.

The exchange pipes 540 are buried in and in thermal contact with the soil along the route, and exchange heat between the soil and the pressurized CO2 carried by pipes 520 and 530. (the pipeline itself may be buried or laid on the surface.) In a preferred embodiment, the pies 540 are run deep into the ground beneath the pipeline, so as to maximize the amount of energy stored in, and recoverable from, a season-independent thermal ground reservoir. The exchange of heat may be passive, as shown in FIG. 4, or may be actively controlled via any desired arrangement of pumps and valves. The length and geometry of the pipes 540, and their depth and spacing in the soil, are likewise subject to considerable variation to meet local conditions. In the passive embodiment shown, the diameter and length of pipes 540 are such that the pressure drop along the length of pipes 540, which corresponds to the difference in pressure between pipes 520 and 530, provides the desired flow rate.

The purpose of these exchange pipes 540 is to store energy in the soil when there is excess heat available from the thermal compressor, and to recover that energy when demand for energy rises. The direction of heat flow is determined by the relative temperatures of the soil and the CO2 in pipe 520.

The network of pipes 540 is effective at storage or withdrawal of energy from the ground when the temperature of the heat transfer fluid is close to the temperature of the soil mass in which the network is embedded. It is only when the average temperature of the ground in which the pipes of the network is higher than the temperature of the heat-transfer fluid that the heat exchange takes place in the ground-to-fluid direction, so that energy is recovered from the warm ground. Thus, only low-temperature networks, with working fluids close to the ambient environment (in this case, the soil register), can solve the problem of storing and destocking thermal energy via ground heating and cooling.

The direction of energy flow can be controlled by making relatively slight changes to the temperature of the CO2 gas flowing in the intermediate pipe 520, and the system as a whole can be tuned to take advantage of the local climate and soil temperatures.

Where appropriate local geology exists, an aquifer thermal energy storage system, a borehole thermal energy system, or any other form of seasonal thermal energy storage (STES) can be employed in place of the soil thermal storage system described here. STES systems are well-known and need not be described here in any detail.

At the destination, the extraction of energy from the supercritical and high-pressure gaseous CO2 may be carried out by a combination of methods. The hot, supercritical CO2 can be used directly to heat buildings. Expansion of both carriers through turbines, and the use of the resulting mechanical energy to power generators, is the most direct method of obtaining electric power. A flow rate of 1 kg of CO2 per second can generate 40 to 80 kW of electrical power, depending on the pressure and temperature at the turbine inlet.

Partially spent CO2, still possessing a useful amount of enthalpy in the form of temperature and/or pressure, can be returned to the transportation system 500 in the intermediate pressure line 520, and the remaining energy extracted by another client downstream within the system.

In a similar way, the non-supercritical compressed CO2 delivered via intermediate pipe 520 can be expanded through a turbine, and the exhaust gas returned to the thermal compressor via low-pressure return pipe 510.

Cooling can be obtained from the delivered gas by simple expansion of either the supercritical or compressed CO2; this process is essentially the operation of the cooling half of a refrigeration cycle using CO2 as the working fluid.

Spent CO2 having little or no usable enthalpy remaining can be vented or sent to an agricultural or industrial user. The economics of this will be dependent upon the demand, at the originating thermal compressor, for an input of CO2 beyond what can be provided by an external source. Because of the expansion that accompanies the extraction of the useful enthalpy in the supercritical and compressed CO2, the volume and flow rate of the returning CO2 may be high, and that the cross-section of return line 530 will be scaled accordingly.

(IV) Heating and Cooling Cycles

Figure 6:
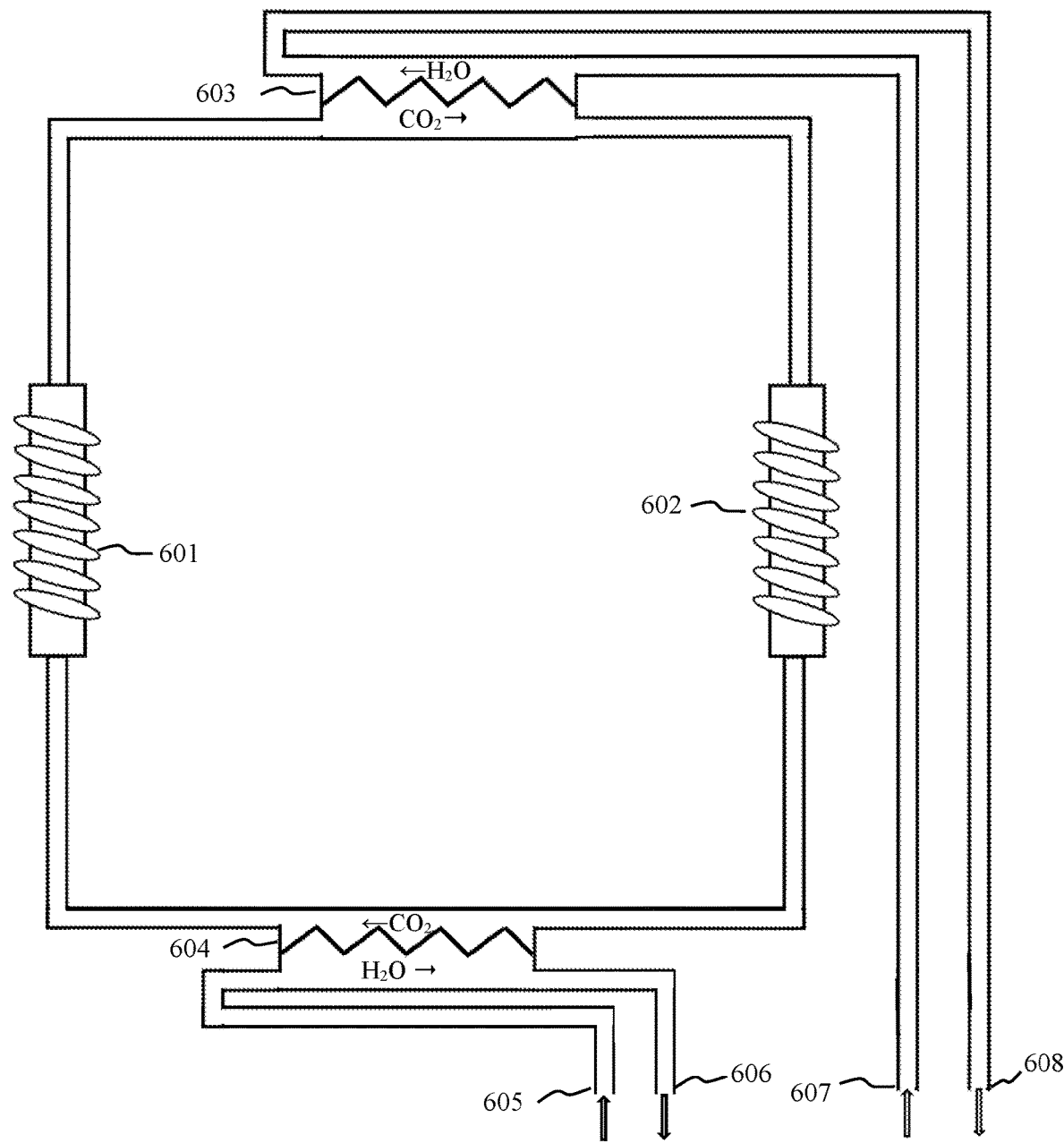
FIG. 6 shows a heating system comprising two inductive thermal compressors operating within a CO2 cycle.

FIG. 6 shows a heat exchange loop employing two inductive thermal compressors 601 and 602, which may be simple steel or Inconel™ tubes with surrounding inductive coils. The illustration is schematic, with valves and their controllers omitted for clarity. Bypass lines, described below, are also omitted, as are any pumps and compressors that might be desired for optimum operation. As described above, the inductive thermal compressors are tubes containing pressurized CO2, sealed off at either end with fast acting on/off valves. Induction coils heat the ferroelectric walls of the compressor tubes directly, which results in very rapid, efficient and low-loss heating of the chambers. Experiments with a 1⅜ inch o.d. (1 inch i.d.) Inconel™ tube, having an i.d. of 1 inch and an o.d. of 1⅜ inches, has demonstrated inductive heating of a 40-inch zone to 800° C. within a few seconds, using an Ambrell EkoHeat™ 20/25 20 kW power supply (Ambrell Corp., Rochester N.Y.) operated at 30 KHz and a 2-inch i.d. induction coil having ca. 1 turn/inch.

Interposed between the compressors are heat exchangers 603 and 604, where the hot and preferably supercritical CO2 transfers thermal energy to water, which flows into inlets 605 and 607 at a relatively low temperature (25-70° C.), and exits at outlets 606 and 608 a temperature useful in heating a building interior (typically 80-95° C.) or for use as sanitary hot water in sinks and showers (typically 50-60° C.) The heat exchangers 603 and 604 are preferably operated independently, to deliver water within these two desired ranges, for example one of them may supply radiators or other heating devices, while the other supplies sanitary hot water to the plumbing system. The amount of heat delivered to each of the exchangers by the hot CO2 can be regulated by controlling the electrical power delivered to the induction coils, the rate at which the CO2 is metered out from the compressors, and by operating bypass lines (not shown) that shunt excess hot CO2 past the exchanger and directly to the. Computer controlled valves and power systems (not shown) are operated by software designed to monitor energy demand and deliver the needed energy while maintaining the efficiency of the system. Operation of the inductive compressors in alternation is expected to keep the CO2 in circulation, with a pulse of CO2 arriving at the inlet to a compressor just as the compression chamber is to be refilled. Circulation pumps (not shown) may be employed in order to optimize the flow rates.

Figure 7:
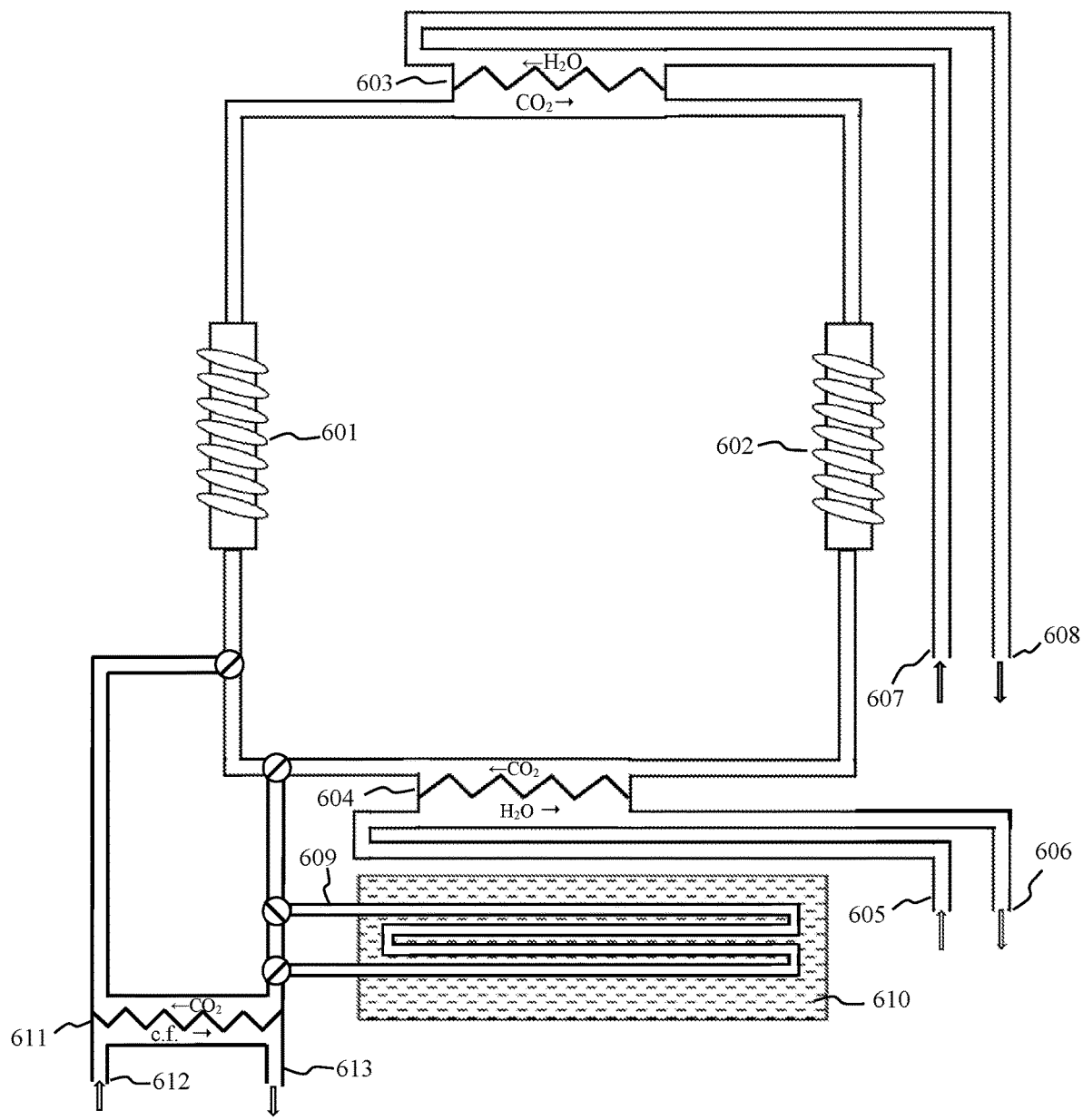
FIG. 7 shows the system of FIG. 6, with an added in-ground thermal storage system and an evaporator for the production of chilled water.

FIG. 7 shows the heat exchange loop of FIG. 6, adapted to provide cooling as well as heating. The CO2 exiting from heat exchanger 604 can be shunted to a cooling loop 609 that is embedded in a thermal storage medium 610. The thermal storage medium can be a tank containing water, sand, gravel, or the like, but is most conveniently soil, i.e. loop 609 is buried in the ground so as to form a seasonal, or alternatively a season-independent, thermal ground reservoir. The cooled, still-compressed CO2 then enters exchanger 611, where coolant (c.f.) entering at inlet 612 is chilled before exiting at outlet 613. The chilled coolant, which may be chilled water or chilled air, is then used in the usual manner for environmental cooling and/or refrigeration.

In preferred embodiments, the pressure within loop 609 is sufficiently high to permit the CO2 to exit the loop in a liquid state, and the exchanger 611 is constructed as an evaporator. In alternative embodiments, the CO2 remains in the gaseous state, and the exchanger 611 allows expansion of the gas to obtain cooling.

The invention thus provides a method of heating, and optionally cooling, an environment such as a building, by transport and delivery of thermal energy, comprising the steps of: confining carbon dioxide within a ferromagnetic enclosure having an entry valve and an exit valve; inductively heating the ferromagnetic enclosure, thereby heating the carbon dioxide, optionally to a supercritical state; opening the exit valve, thereby releasing the heated carbon dioxide through the exit valve into the energy supply line of a heat-exchange loop; closing the exit valve; opening the entry valve; admitting carbon dioxide from the return line of the heat-exchange loop through the entry valve into the ferromagnetic enclosure; closing the entry valve; and repeating the above steps in a cycle, thereby supplying heated carbon dioxide to the heat exchange loop.

The invention also provides a method wherein the heat exchange loop described above transfers heat from the carbon dioxide to a circulating water loop.

Carbon dioxide exiting a heat exchanger may optionally be cooled and liquefied by passage through a thermal ground reservoir, and then used as the coolant in an evaporator to chill a coolant fluid in a chiller loop.

The coolant in the chiller loop may be water, an alcohol, a glycol, or a mixture thereof.

In another embodiment, a loop comprising two inductive heaters and two heat exchangers, as shown in FIG. 6, is employed. The method comprises: confining carbon dioxide within a first ferromagnetic enclosure having a first entry valve and a first exit valve; inductively heating the first ferromagnetic enclosure, thereby heating the carbon dioxide; opening the first exit valve, thereby releasing the heated carbon dioxide through the first exit valve into the inlet of a first heat exchanger; closing the first exit valve; admitting carbon dioxide from the exit of the first heat exchanger through a second entry valve of a second ferromagnetic enclosure having a closed second exit valve; closing the second entry valve, thereby confining the carbon dioxide within the second ferromagnetic enclosure; inductively heating the second ferromagnetic enclosure, thereby heating the carbon dioxide; opening the second exit valve, thereby releasing the heated carbon dioxide through the second exit valve into the inlet of a second heat exchanger; closing the second exit valve; admitting carbon dioxide from the exit of the second heat exchanger through the first entry valve of the first ferromagnetic enclosure; closing the second entry valve; and repeating steps (b) through (k) in a cycle, thereby supplying heated carbon dioxide to said first heat exchanger and said second heat exchanger. Optionally, in one or both inductive heaters, the carbon dioxide may be heated to a supercritical state.

Carbon dioxide issuing from the exit of the second heat exchanger may optionally be admitted into a cooling loop that is embedded in a thermal storage medium, thereby cooling the carbon dioxide until it condenses to a liquid. The liquid carbon dioxide exiting the cooling loop may be admitted into an evaporator heat exchanger, and a coolant fluid can thereby be chilled by evaporating the liquid carbon dioxide in the evaporator. The carbon dioxide, once evaporated, is then admitted into the first ferromagnetic enclosure, and the heating and thermal exchange steps are repeated.

The methods and apparatus of the invention can provide both heating and cooling, with a single working fluid and a minimum number of moving parts. The invention provides heating and cooling with high efficiency and low maintenance costs.

We claim:

1. A method for the generation, transport and delivery of thermal energy, comprising the steps of:
   (a) confining carbon dioxide within a ferromagnetic enclosure having an entry valve and an exit valve;
   (b) inductively heating the ferromagnetic enclosure, thereby heating the carbon dioxide;
   (c) opening the exit valve, thereby releasing the heated carbon dioxide through the exit valve into the energy supply line of a heat-exchange loop;
   (d) closing the exit valve;
   (e) opening the entry valve;
   (f) admitting carbon dioxide from the return line of the heat-exchange loop through the entry valve into the ferromagnetic enclosure;
   (g) closing the entry valve; and
   (h) repeating steps (a) through (g), thereby supplying heated carbon dioxide to said heat exchange loop.

2. The method according to claim 1, wherein the heat exchange loop transfers heat from the carbon dioxide to a circulating water loop.

3. The method according to claim 1, wherein the carbon dioxide is heated to supercritical pressure.

4. The method according to claim, wherein the carbon dioxide is heated to supercritical pressure.

5. The method of claim 1, wherein carbon dioxide exiting a heat exchanger is cooled and liquefied by passage through a thermal ground reservoir, and then used as the coolant in an evaporator to chill a coolant fluid in a chiller loop.

6. The method of claim 5, wherein the coolant fluid comprises water.

7. The method of claim 5, wherein the coolant comprises an alcohol, a glycol, or a mixture thereof.

8. A method for the generation, transport and delivery of thermal energy, comprising the steps of:
   (a) confining carbon dioxide within a first ferromagnetic enclosure having a first entry valve and a first exit valve;
   (b) inductively heating the first ferromagnetic enclosure, thereby heating the carbon dioxide;
   (c) opening the first exit valve, thereby releasing the heated carbon dioxide through the first exit valve into the inlet of a first heat exchanger;
   (d) closing the first exit valve;
   (e) admitting carbon dioxide from the exit of the first heat exchanger through a second entry valve of a second ferromagnetic enclosure having a closed second exit valve;
   (f) closing the second entry valve, thereby confining the carbon dioxide within the second ferromagnetic enclosure;
   (g) inductively heating the second ferromagnetic enclosure, thereby heating the carbon dioxide;
   (h) opening the second exit valve, thereby releasing the heated carbon dioxide through the second exit valve into the inlet of a second heat exchanger;
   (i) closing the second exit valve;
   (j) admitting carbon dioxide from the exit of the second heat exchanger through the first entry valve of the first ferromagnetic enclosure;
   (k) closing the second entry valve; and
   (l) repeating steps (b) through (k), thereby supplying heated carbon dioxide to said first heat exchanger and said second heat exchanger.

9. The method of claim 8, further comprising, after step (i), admitting carbon dioxide from the exit of the second heat exchanger into a cooling loop that is embedded in a thermal storage medium, thereby cooling the carbon dioxide until it condenses to a liquid, admitting the liquid carbon dioxide exiting the cooling loop into an evaporator heat exchanger, and chilling a coolant fluid by evaporating the liquid carbon dioxide in the evaporator, before admitting the carbon dioxide into the first ferromagnetic enclosure.

10. The method of claim 9, wherein the coolant fluid comprises water.

11. The method of claim 9, wherein the coolant comprises an alcohol, a glycol, or a mixture thereof.

* * * * *